United States Patent [19]

Bose

[11] 4,340,772

[45] Jul. 20, 1982

[54] COVER PLATES FOR ELECTRICAL UTILITY AND OTHER BOXES AS USED IN CONCEALED WIRING SYSTEM OF BUILDINGS

[76] Inventor: Biswa N. Bose, P.O. Box 116, Station-M, Toronto, Ontario, Canada, M6S 4T2

[21] Appl. No.: 171,728

[22] Filed: Jul. 24, 1980

[30] Foreign Application Priority Data

Jul. 15, 1980 [CA] Canada .................................. 355547

[51] Int. Cl.³ ............................................. H02G 3/18
[52] U.S. Cl. ........................................ 174/51; 174/66
[58] Field of Search ............................. 174/66, 67, 51; 220/241, 242; 339/123, 14 L; 307/147; D8/350, 351, 352, 353

[56] References Cited

U.S. PATENT DOCUMENTS 1,741,823 12/1929 Burg .................................. 174/66 X

FOREIGN PATENT DOCUMENTS 778519 2/1968 Canada .

Primary Examiner—B. A. Reynolds
Assistant Examiner—David A. Tone
Attorney, Agent, or Firm—Ridout & Maybee

[57] ABSTRACT

Cover plates, for electrical utility, junction or similar boxes as used in concealed low voltage 2-wire (live phase, neutral) wiring system in old buildings, have one or more suitable bosses with small knock-out holes or only U-shaped or circular knock-out holes with suitable field-installed buildings on the flat surfaces or have suitable arc-shaped dimples on the side-walls. These knock-out openings are used, as necessary, to provide an obstruction-free passage of grounding wires into the boxes; thus the metal boxes and all non-current-carrying metal parts of receptacles, switches and other electrical devices as used, are bonded to system grounding. The grounding wires are installed in an unconcealed or semi-concealed manner, thus converting the 2-wire wiring system of a building into conventional 3-wire (live phase, neutral, ground) system. To promote safety from electrical hazards, all previously installed 2-pin receptacles can now be replaced by 3-pin grounding type ones and the grounding pin of each 3-pin receptacle can now be bonded to system grounding. When this 3-wire wiring system is fully established in all buildings, manufacturers of all domestic equipment, as applicable, will be encouraged to include the grounding feature in their products. This will make their products more reliable, safer and cheaper as far as design, manufacturing and other indirect costs are concerned. This device will further promote safety of life and property from electrical hazards; however its use and application will depend on the decision of the Authorities concerned.

12 Claims, 3 Drawing Figures

SOURCE OF ELECTRICAL ENERGY

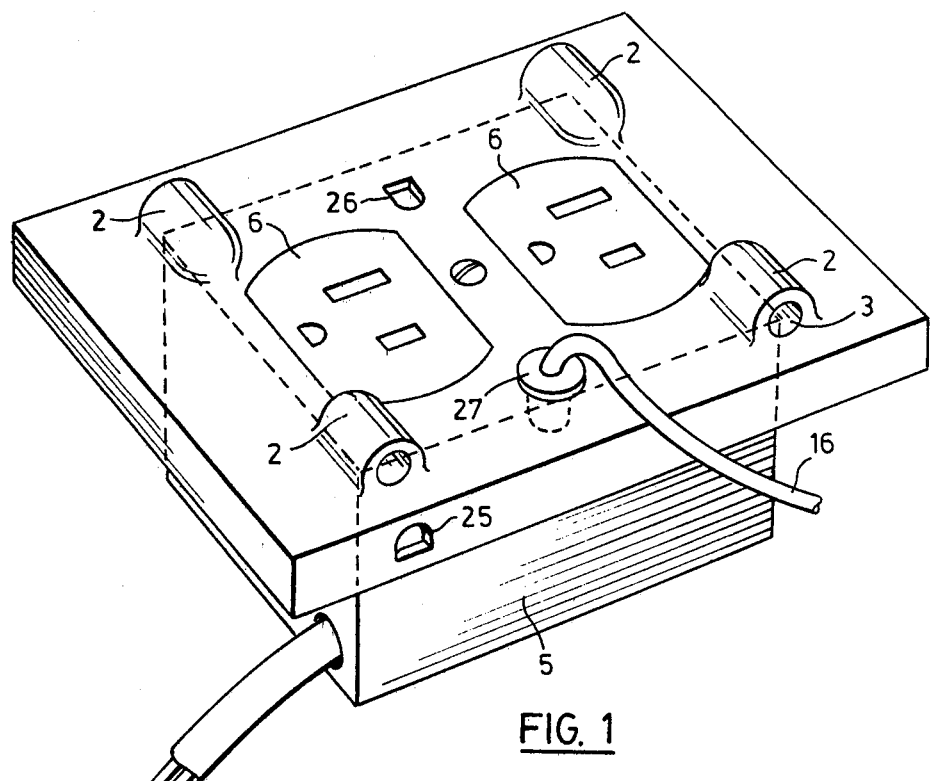
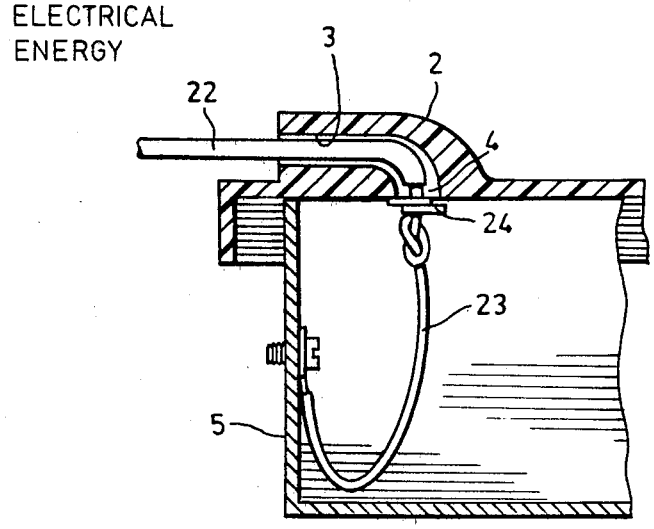
FIG. 1
SOURCE OF
ELECTRICAL
ENERGY
FIG. 1A

COVER PLATES FOR ELECTRICAL UTILITY AND OTHER BOXES AS USED IN CONCEALED WIRING SYSTEM OF BUILDINGS

BRIEF SUMMARY OF INVENTION

Conventional cover plates are secured to various types of electrical utility, junction or similar boxes (as used in concealed wiring system of buildings) by one or more screws such that no live parts are accessible. The construction of these cover plates are modified to include suitable boss assemblies with knock-out holes or suitable U-shaped or circular knock-out holes on their flat surfaces or suitable arc-shaped or similar knock-out dimples on their side-walls. The above-mentioned knock-out openings can thus be used to permit the passage of grounding cables or cords or wires into the boxes where such grounding wires were not included in the original low voltage 2-wire wiring system of buildings. Thus the missing grounding wire in a 2-wire wiring system of a building can be installed in an unconcealed or semi-concealed manner for bonding all non-current-carrying metal parts to system ground. This is the easiest and cheapest method of converting the old 2-wire (without grounding wire) low voltage wiring sytem to currently used 3-wire (which includes grounding wire) low voltage wiring system of the buildings as concerned.

According to the present invention there is provided an electrical circuit comprising an electrical circuitry box of electrically conducting material; and an electrical unit which may be an electrical receptacle unit, lamp holder or similar outlet unit, an electrical switch unit, an electrical junction unit, or a combination thereof and which is mounted within the box and connected by electric cable means to a source of electrical energy, wherein a cover plate is mounted on the box, at least one opening is provided through the cover plate, and a grounding cable is reliably secured to the box, is disposed through said opening in the cover plate, and is connected to supply ground.

BRIEF DESCRIPTION OF DRAWINGS

The cover plate of a typical duplex receptacle as designed and constructed in accordance with the invention is illustrated in the accompanying drawings under FIGS. 1, 1A and 2.

In FIG. 1 the full scale isometric view of the cover plate as placed on a commonly used electrical utility box is shown.

In FIG. 1A a sectioned view on the line 1A—1A in FIG. 1 is shown on an enlarged scale.

DETAILED DESCRIPTION OF INVENTION

Figure 2:
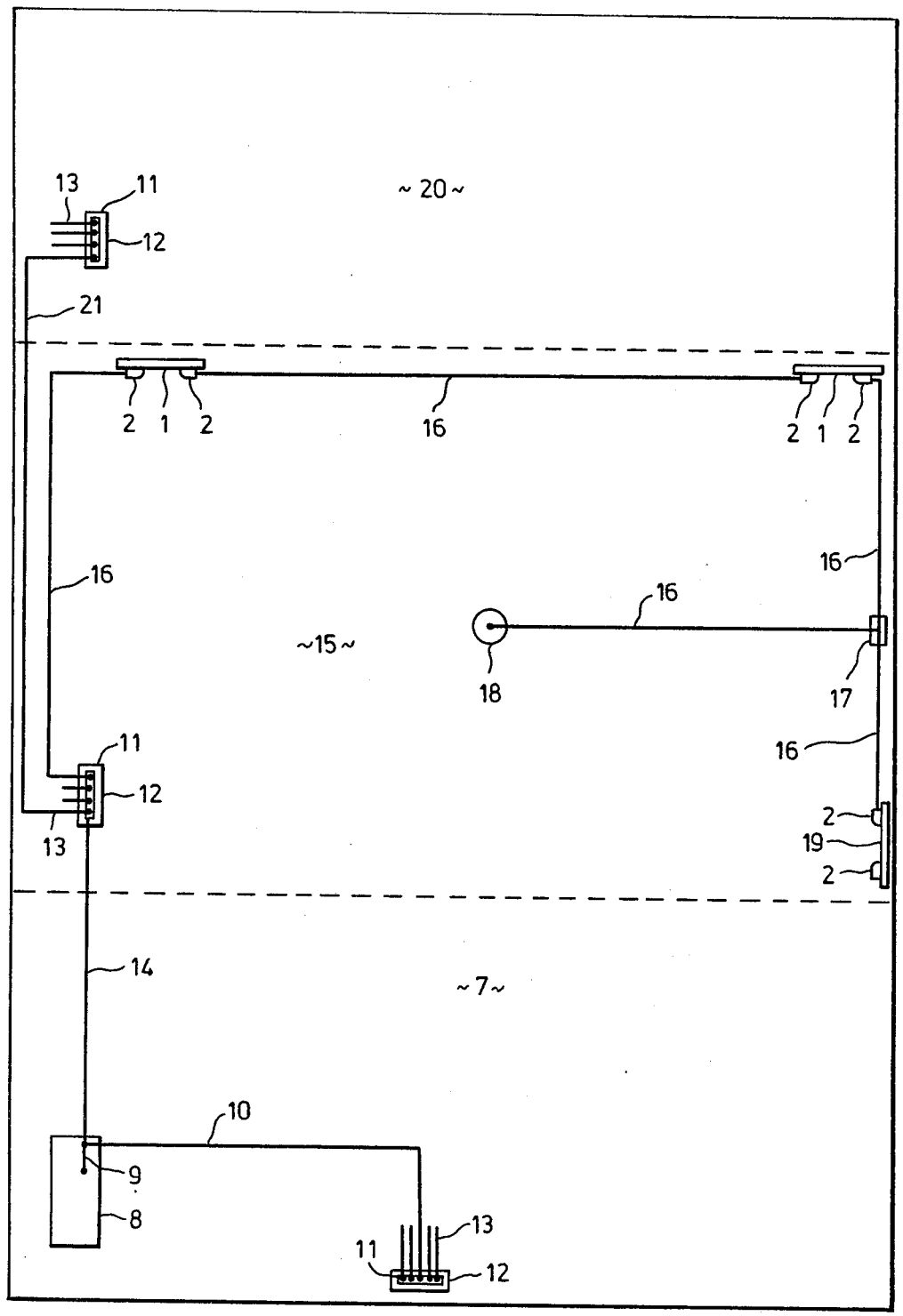
In FIG. 2 the schematic partial wiring diagram of the grounding cable or cord alone is shown in a 3-storied residential building which has concealed 2-wire internal wiring system.

The low voltage electrical wiring systems of a building are generally concealed or rendered inaccessible after the installation has been approved by the Local Inspection Authorities. In old buildings, the concealed internal wiring mainly consists of 2-wire (one live phase and one neutral) cables and these cables ultimately terminate at 2-pin receptacle outlets, lamp fixtures or lamp-holders through switches or their combination. Lately, buildings are constructed with concealed internal wiring consisting of 3-wire (one live phase, one neutral and one ground) cables, and the grounding wires are thus bonded to all non-current-carrying metal parts namely receptacle, switch and junction boxes, lamp fixtures and other applicable domestic electrical wiring devices.

This invention refers to a very cost saving and easy method of updating the 2-wire internal system in old buildings to a 3-wire wiring system by installing a suitable non-combustible (oil and water resistant where applicable) single-conductor cable or cord for grounding purposes in an unconcealed or semi-concealed manner, similar to the routing and installation of television cables or telephone cables. The color of the outer insulating jacket of such grounding cables or cords and the inner insulation of the grounding conductor should preferably be green and to prevent the cable or cord from mechanical abuse or likewise, some caution note, "SUPPLY GROUND-DO NOT TAMPER" or similar wording should be imprinted in a permanent and legible manner on the outer jacket at regular intervals of eight to ten inches along the cable or cord length. The grounding cables or cords will enter the utility and other boxes through their respective modified cover plates and the grounding conductors will be bonded to the boxes and other non-current-carrying metal parts as located inside the boxes in an acceptable manner. The main grounding cable will originate from the main circuit-breaker as located at the supply entry and will be bonded to the supply grounding terminal or bus-bar of the main circuit-breaker in a reliable manner. Also the previously installed 2-pin receptacles should be changed to 3-pin grounding type ones and the grounding pin of each receptacle should be bonded to the grounding system inside the utility box in a reliable manner.

Referring to the drawings, in FIG. 1, the rectangular cover place 1 is of standard dimensions, made of standard metallic or non-combustible non-metallic material and is used in conjunction with a duplex or a single receptacle and a switch assembly, not shown in the drawing. This cover plate 1 has four integrally molded or made bosses 2, suitably shaped and located as shown. As shown in FIG. 1A, each boss 2 has a cylindrical blind passage hole 3 for positioning the grounding cable or cord 16 near the small knock-out hole 4 which permits the "green" insulated grounding wire of the above-mentioned grounding cable or cord 16 to enter the electrical utility box 5. The strain-relief of the grounding cable or cord is further achieved by a tight knot 23 around the grounding wire or by an insulated hog-ring 24 which is located on the underface of the cover plate 1. Also a few inches of slack length of the grounding wire is kept inside the electrical utility box 5 prior to its bonding to non-current-carrying metal parts. This slack length is necessary for easy mounting or removal of the cover plate 1 from the electrical utility box 5. The total number of above-mentioned bosses 2 along with knock-out holes 4 on the cover plate 1 may be one, two, three or four; this will depend on their requirements as well as manufacturing costs. Also the shape and size of the cut-out sections 6 of the cover plate 1 will be according to the electrical component or components installed in the utility box 5.

An alternative modification of a standard cover plate may be achieved by providing one, two, three or four suitably located smooth circular or semi-circular arc-shaped knock-out dimples or openings, such as the semi-circular opening 25 also shown for convenience in FIG.

1, near the lower edges of the cover plate side-wall or walls. The grounding cable or cord 16 is routed into the utility box 5 through the above-mentioned opening 25 and is held in position when the cover is mounted in a permanent manner by a mounting screw or screws. If necessary, the strain-relief of the grounding cable or cord 16 is further achieved by a suitable insulated hog-ring, such as the hog-ring 24, or by a tight knot, such as the knot 23, around the insulated grounding wire inside the utility box 5. In some standard cover plates, it may be necessary to increase slightly the height of the side walls as well as the height of the pillar body of the cover plate-mounting screw or screws to achieve the above-mentioned purposes; in that case, it may require an internally molded or made skirt of suitable thickness and height around the bottom edges of each cut-out portion 6 of the cover plate 1 such that no live parts are accessible after final installation. Also the underface of some cover plates 1 may require slight modification such that the insulated grounding wire can be easily routed into the utility box 5 without any obstruction.

In some cases, the above-mentioned modified cover plates 1 are not necessary for routing the grounding cable or cord 16 into and out of the electrical utility or similar boxes 5. This is achieved by making one or two suitable U-shaped knock-out slots 26 (also shown for convenience in FIG. 1) at appropriate locations on the flat surface of the cover plates 1 as concerned; strain-relief of the grounding cable or cord 16 is achieved by a suitable tight-fitting non-combustiblle phenolic or similar strain-relief bushing, such as the bushing 27 shown diagrammatically in FIG. 1. The knock-out slot or slots 26 and bushings 27 are primarily intended to be provided in a cover plate for a utility box in a relatively inaccessible location, such as a ceiling fixture.

Alternatively the same purpose is accomplished by providing one or two suitable smooth round knock-out holes in the cover plate and then by routing the grounding cable or cord 16 into the utility box 5 through suitable tight-fitting non-combustible thermoplastic or similar bushings; strain-relief of the grounding cable or cord 16 is achieved by a suitable insulated hog-ring, such as the hog-ring 24, or by placing a suitable tight knot, such as the knot 23, around the grounding wire of the cable or cord 16.

In all cases, as mentioned above, a few inches of slack length of the grounding cable or cord 16 or insulated grounding wire is left inside each box for easy mounting or removal of the cover plate 1 from the concerned box 5.

The term "knock-out" as herein used in relation to openings, holes, slots and the like refers to openings, holes, slots and the like from which the knock-out plugs are capable of being removed, when required, to provide knocked-out openings, holes, slots and the like. For clarity, all such openings, holes, slots and the like illustrated in the accompanying drawings are shown in the knocked-out condition.

FIG. 2 shows a partial schematic wiring diagram of the unconcealed or semi-concealed grounding cable or cord along with the application and usefulness of the modified cover plates 1 inside a 3-storied building which has a concealed 2-wire internal wiring system. The routing, installation and stapling at intervals, of the grounding cable or cord are done in the same ways as a telephone cable or television cable is done. In basement 7, the main supply cables enter the buildings and ultimately terminate at the main circuit-breaker 8 where only the supply grounding bus-bar or terminal 9 is shown in the diagram. A suitable non-combustible grounding cable or cord 10 is routed and installed along the basement walls and about four to six inches above the floor level and is terminated to a centrally located suitable non-combustible terminal block 11 which has a requisite number of terminals fitted with suitable shorting bars or bare wire. This terminal block 11 has also a dust-proof non-combustible cover 12 secured to the base of the terminal block 11 in a reliable manner. Each room has at least one suitable non-combustible grounding cable or cord 13 which originates from the terminal block 11 and connects non-current-carrying metal parts of all utility and similar boxes as located in that particular room.

Another suitable non-combustible grounding cable or cord 14 is taken out of the grounding terminal or bus-bar 9 and is routed to the first floor 15 in a proper convenient and if possible semi-concealed manner and is finally terminated to a centrally located similar terminal block 11 provided with a similar cover 12. For the sake of clarity, the wiring diagram of the non-combustible grounding cable or cord 16 for one room in the first floor 15 is shown. It is also assumed that there are two duplex receptacle outlets, one ceiling lamp and one switch in that particular room; and their boxes 5 are all fitted with modified appropriate cover plates 1 in accordance with the invention. The first branch grounding cable or cord 16 originates from terminal block 11 and enters the nearest duplex receptacle utility box through a boss 2 of the modified cover plate 1. The grounding wire of the cable or cord 16 is then bonded in an acceptable manner to the utility box 5 as well as all non-current-carrying metal parts of the duplex receptacles; the grounding cable or cord 16 is then brought out of the utility box through the second boss 2 of the same cover plate 1. This second branch grounding cable or cord 16 is then routed in a similar manner to the second duplex receptacle utility box and cover plate assembly. The third grounding cable or cord 16 emerges from the second boss 2 of the second duplex receptacle cover plate 1 and terminates inside a suitable small standard protected non-combustible junction box 17 installed in a convenient location. The fourth grounding cable or cord 16 originates from the above-mentioned grounding wire junction box 17 and terminates inside the ceiling lamp utility box through the modified cover plate 18. The lay-out of this particular grounding cable or cord 16 on the ceiling may require a suitable non-combustible support batten and this may be concealed by using a suitable adhesive decorative canopy. The fifth grounding cable or cord 16 comes out of the junction box 17 and enters the switch utility box through the boss 2 of the modified switch cover plate 19. In all cases, as stated above, the grounding wire of the cable or cord 16 is bonded to the utility boxes 5 as well as all non-current-carrying metal parts of the electrical components as mounted inside or on the utility boxes 5. The distribution of grounding system in the second floor 20 is achieved in a similar manner by drawing another suitable non-combustible grounding cable or cord 21 from the terminal block 11 as located in the first floor 15. In some cases, where the routing of the grounding cable or cord is done through the ceiling or floor of a room, the concealed portion of the particular grounding cable or cord may require further protection.

The terminology "grounding cable or cord" as used in the above specification of the invention, also included the alternative wording "insulated grounding wire" where such wire has adequate suitable insulation to make it non-combustible and where applicable it has an additional proper protective coating to make it water and oil resistant. In all cases, selection of the grounding conductor size and its over-all insulation thickness and type of insulating material in any circuity as stated above, will primarily depend on total allowable ground impedance, heat dissipation characteristics under environmental and abnormal conditions and characteristics of branch circuit protective devices.

Also the above-mentioned modified cover plates may be used in any building, new or old, for bringing out isolated, extra-low-voltage leads or terminals from the respective utility, junction or similar boxes as used in internal electrical wiring system of low voltage supply.

Grounding, when efficiently done in an electrical wiring system of a building, ensures the safety of life and property from electrical hazards; and in certain cases it will help in eliminating wastage of electrical energy. Complete re-wiring of any old electrical installation or proper routing of additional single conductor cables for grounding purposes through concealed or inaccessible ducts in a building are not always practical or economical. Also instruments may fail to detect minor insulation or conductor damages of new cables after installation; this damage to cables may later develop to electrical hazards. Hence, without disturbing the old cables, if they are found healthy by meter tests, the external lay-out of the grounding cables or cords and their proper entry to the utility and other boxes through the above-mentioned modified cover plates should be acceptable to the Authorities concerned as well as to the owners of such buildings. In other words public interest will reflect in this type of conversion of low voltage internal electrical wiring from 2-wire (one live phase, one neutral) to 3-wire (one live phase, one neutral, one ground) system; they will be more than willing to replace the old 2-pin receptacle outlets by proper grounding type 3-pin ones and will gladly bear the expenses of necessary replacement and addition of other wiring devices as used in bathrooms and kitchens of a modern building. When this 3-wire internal electrical wiring system is fully established in all buildings, the manufacturers of various domestic portable cord-connected or direct plug-in products will be prompted to do, where necessary, appropriate changes thus making their products more reliable, safer and cheaper due to reduction in design, maufacturing and other associated indirect costs. Also, to promote their sales projects, they will arrange to make this change (where applicable) in their old products, which are already being used by the consumers, at a nominal cost. However, the application of this device and the methods of its use will primarily depend on the consideration and decision of the Government, affiliated authorities, electrical utilities, industries and the public as concerned.

Having described all essential features including the use and application of my said invention and in what manner the same is to be performed, I declare that what I claim is:

1. An electrical circuit comprising an electrical circuitry box of electrically conducting material; and an electrical unit mounted within the box and connected by electric cable means to a source of electrical energy, wherein a cover plate is mounted on the box, at least one opening is provided through the cover plate, and a grounding cable is reliably secured to the box, is disposed through said opening in the cover plate, and is connected to supply ground.

2. An electrical circuit according to claim 1, wherein the cover plate has an outer face presenting an outwardly projecting boss, the opening through the cover plate comprising a blind passage provided in the boss and a hole through the cover plate and communicating with the inner end of the blind passage, with said hole through the cover plate being substantially at right angles to the plane of the cover plate and the blind passage in the boss being substantially parallel to the plane of the cover plate.

3. An electrical circuit according to claim 2, wherein the outwardly projecting boss is integral with the cover plate.

4. An electrical circuit according to claim 1, wherein said at least one opening through the cover plate is a circular knocked-out opening.

5. An electrical circuit according to claim 1, wherein said at least one opening is through a side wall of the cover plate and is a semi-circular, knocked-out opening.

6. An electrical circuit according to claim 1, wherein the opening through the cover plate is a U-shaped, knocked-out opening.

7. An electrical circuit according to claim 1, or claim 4, or claim 5, wherein a strain relief bushing is mounted within said at least one opening through the cover plate, the grounding cable being disposed through the bushing and being substantially clamped or held thereby.

8. An electrical circuit according to claim 6, wherein a strain relief bushing is mounted within said at least one opening through the cover plate, the grounding cable being disposed through the bushing and being substantially clamped or held thereby.

9. An electrical circuit according to claim 1, or claim 4, or claim 5, wherein the grounding cable has a tight knot therein, the tight knot being adjacent an inner face of the cover plate and being incapable of passing through the opening therein.

10. An electrical circuit according to claim 6, wherein the grounding cable has a tight knot therein, the tight knot being adjacent an inner face of the cover plate and being incapable of passing through the opening therein.

11. An electrical circuit according to claim 1, or claim 2, or claim 4, wherein said at least one opening through the cover plate comprises a plurality of such openings through the cover plate.

12. An electrical circuit according to claim 5 or claim 6, wherein said at least one opening through the cover plate comprises a plurality of such openings through the cover plate.

* * * * *